A. P. ROESENER.
EXHIBITING APPARATUS.
APPLICATION FILED JAN. 26, 1912.

1,087,889.

Patented Feb. 17, 1914.
5 SHEETS—SHEET 4.

Fig. 4.

WITNESSES

INVENTOR
Adolph P. Roesener
BY
ATTORNEYS

A. P. ROESENER.
EXHIBITING APPARATUS.
APPLICATION FILED JAN. 26, 1912.

1,087,889.

Patented Feb. 17, 1914.
5 SHEETS—SHEET 5.

WITNESSES

INVENTOR
Adolph P. Roesener
BY
ATTORNEYS

UNITED STATES PATENT OFFICE.

ADOLPH P. ROESENER, OF NEW YORK, N. Y.

EXHIBITING APPARATUS.

1,087,889.  Specification of Letters Patent.  Patented Feb. 17, 1914.

Application filed January 26, 1912. Serial No. 673,526.

*To all whom it may concern:*

Be it known that I, ADOLPH P. ROESENER, a citizen of the United States, and a resident of the city of New York, borough of Manhattan, in the county and State of New York, have invented a new and Improved Exhibiting Apparatus, of which the following is a full, clear, and exact description.

My invention relates to exhibiting apparatus which is primarily designed for advertising purposes; and it comprises a new and improved construction of this sort which is automatically actuated and controlled so as to move a plurality of slides or negatives in succession into operative relation with respect to a projecting device by means of which the designs formed on the slides are thrown upon a screen, to be viewed.

The primary object of my invention is to provide a movable casing or carrier in which the slides or negatives are placed, this carrier being associated with operating mechanism which moves the casing and controls the slides in such a way as to permit them to be moved one by one out of the casing into proper position with respect to the projecting apparatus when the designs or other matter which is formed on the negatives is to be exposed for observation; and which, after such exposure has taken place, will move the negative back into the carrier so as to clear the way for the next slide or negative.

A further object of my invention is to construct the controlling mechanism for my exhibiting apparatus so that the carrier will not be actuated while a slide or negative is being moved into operative relation with respect to the projecting device, or out of operative relation with respect to the same; and to provide means whereby this actuating mechanism will also control the source of light which is employed when the projecting device is in use, the connections being such that the light will be turned on when a negative or slide is in exposed position, the carrier at this time being held against movement; and the light turned off, and the carrier moved after the exposure is finished, to take up the negative that has just been employed in the projecting device and move another negative into position to replace the first slide or negative.

These and other objects of my invention will more fully appear from the following description taken in connection with the appended claims, wherein the invention and the novel features will be distinctly and clearly specified.

Reference is to be had to the accompanying drawings forming a part of this specification, in which the same characters of reference indicate the same parts in all the views.

Referring particularly to the drawings, the numeral 1 indicates a suitable base, upon which is mounted a casing 2, containing a lamp 3. This lamp 3 supplies light for the projecting device which forms a part of my exhibiting apparatus. The projecting device in question comprises a pair of lenses 4 mounted in a bushing 5 that is adjustably fitted to the inside of a cylindrical projection 6, extending from the casing 2 at the level of the lamp therein. 7 represents a similar pair of lenses spaced from the lenses 4 and mounted in a bushing 8 that is adjustably fitted inside the end of a tube 9. This tube 9 is fitted into the end 10 of a hood 11, and the end 10 in question has a projection 12 which is secured to a standard 13 mounted upon the base 1 by means of a screw 14. The projection 6, the tube 9 and the end 10 of the hood 11 are of course mounted in proper alinement to permit light to pass through the lenses 4 and 7 in a continuous direction. The hood 11 has a partition 15 inside the same at the junction of the flaring body thereof with the end 10, and this projection has an aperture 16 therethrough, which permits the light to pass. The wide end of the body portion of the hood 11 has a plate 17 of glass therein, and this body is supported by means of a bracket 18, likewise secured to the base 1 at the end opposite the casing 2. I may make the glass 17 preferably transparent, so that the designs formed on the negatives used in the projecting device can be formed on a screen in front of the hood 11; or I may make the plate 17 of ground glass, or provide it with a matt surface, so as to make this plate itself serve the purpose of the screen. In the latter case the designs will be thrown upon the rear face of the glass and will be in plain view of any one standing in front of the hood 11.

The numerals 19 represent a pair of standards on the base 1, each of these standards being shaped like an inverted V, and each carrying a bearing 20 in its top. In this bearing is mounted a shaft 21; and the numerals 22 represent screws which pass through the ends of the bearings and engage the ends of the shaft to press upon its ends and control the position of the same. This shaft carries a pair of wheels 23, the hubs of these wheels being secured to the shaft by means of bolts 23', so as to compel the wheels to rotate with the shaft; and the spokes 24 of these wheels have guides 25 in their adjacent faces to receive U-shaped frames 26. Each of the frames 26 has one lateral edge fitting into the groove 25 of the spoke 24 on one wheel, and its opposite lateral edge received in the groove 25 of a correspondingly-located spoke on the other wheel, so that each of the frames 26 will lie in a radial plane. When engaged by the grooves 25 in the spokes 24, the closed ends of the U-shaped frames will be located adjacent the circumference of the wheels 23, and the inner ends of the lateral arms of each U-shaped frame 26 will lie adjacent the shaft 21. The inner ends of these frames will be closed by means of bars 27 used with each of the frames 26, and the inner edges of the frames 26 will have grooves formed therein to receive the slides or negatives 28. These slides or negatives will be held in position by the bars 27, the ends of which likewise engage the grooves with sufficient tightness to prevent the negatives from sliding out of position.

29 represents a sleeve surrounding the shaft 21, but spaced from the same, and having its opposite ends engaged by the central portions or hubs of the two wheels 23; and 30 represents a washer of any suitable material carried by the sleeve 29 at its opposite ends, against which the inner ends of the arms of the U-shaped frames 26 rest.

The two wheels 23 mounted to revolve with the shaft 21 and the guides or grooves 25 carried by the spokes thereof to receive the lateral edges of the frames 26, form a rotating carrier by means of which each of the slides or negatives is brought in turn into position to be delivered to the projecting device. This casing or carrier is covered by means of a hood 31 of any suitable shape. This cover has arms 32 which rest upon the top of the standards 19 to secure the cover in place, and it has an opening 33 at the top, through which the slides or negatives are inserted into the carrier; and a similar opening 34 opposite the opening 33, through which the slides or negatives pass when they are delivered to the projecting device in a manner presently to be described.

35 represent oil cups by means of which lubricant is supplied to the shaft 21 when the carrier and the shaft rotate.

The carrier and the shaft on which the same is mounted are turned by means of a ratchet wheel 36, mounted adjacent one of the wheels 23, and rigidly secured to the same. This ratchet wheel is operated by means of a reciprocating rod 38 which has its upper end received in a bracket 37 carried by the adjacent standard 19, and has adjustably secured thereon a pawl 39, this pawl engaging the ratchet and moving it when the rod 38 is reciprocated.

Figures 5, 6, 7, 8:
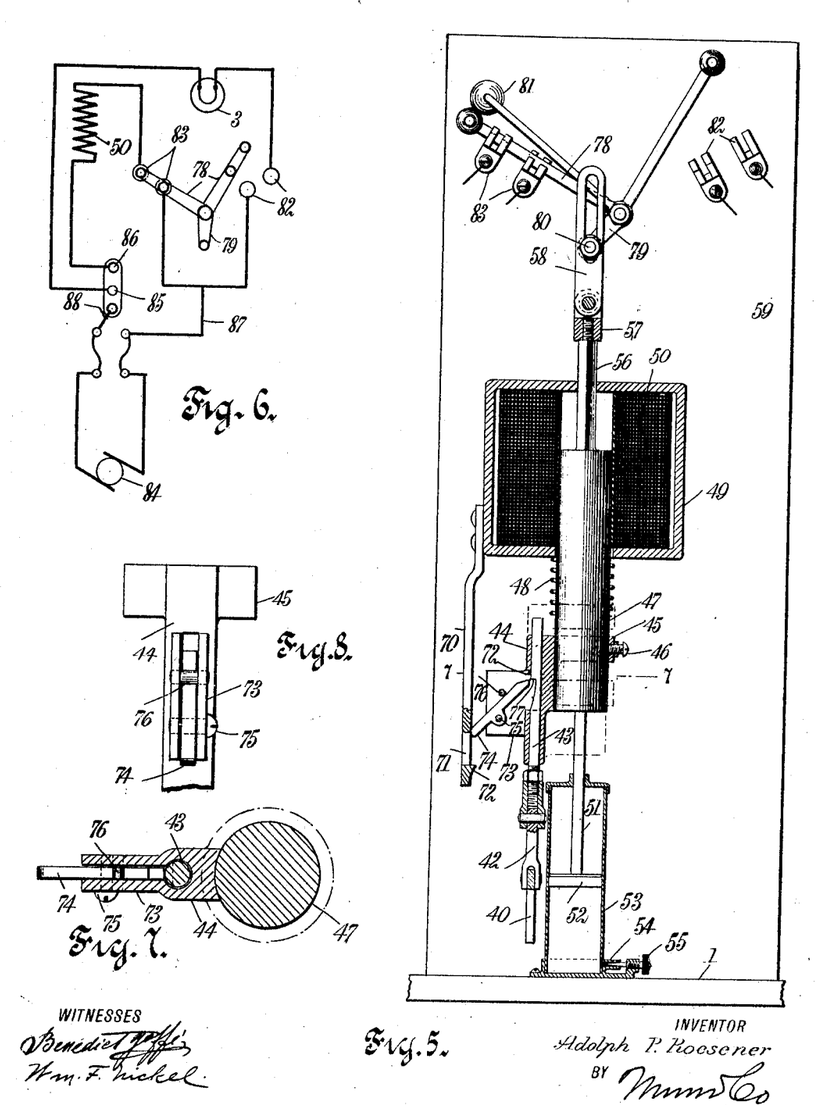
Fig. 5 is a sectional view on the line 5—5 of Fig. 4, looking in the direction of the arrow.
Fig. 6 is a diagram of the circuits.
Fig. 7 is a horizontal sectional view on the line 7—7 of Fig. 5.
Fig. 8 is a side elevation of the trip device which forms part of the actuating and controlling mechanism for my apparatus.

At its lower end the rod 38 is connected by means of a short link 38' to a lever 40, which is secured at one end to a pivot 41, carried by the base 1. Between the point of connection of the short link 38' and the pivot 41, this lever 40 is joined to a link 42 which is pinned at its upper end to a bar 43. The method of connecting the link 42 to the bar 43 involves, as shown in Fig. 5, the use of a sleeve having one end internally threaded to receive the threaded lower end of the rod 43, and carrying a pivot pin in its opposite end to fasten thereto the upper end of the link 42. This bar 43 slides in a guide-block 44 having a collar 45 at one end and a binding screw 46 to secure the block to a magnetic plunger 47. This plunger is drawn up by means of a solenoid 50, mounted in the casing 49, and this casing 49 carries projecting from its lower face and surrounding the plunger 47, a spring 48, this spring engaging the block 45 when the same is at a certain height.

At its lower end the plunger 47 is connected to a rod 51, on the end of which is secured a piston 52, moving in a cylinder or dash-pot 53. The lower end of this dash-pot has an air-escape port 54, which is controlled by means of a needle valve 55, this needle valve being in the form of a screw, so that the same can be adjusted, as shown particularly in Fig. 5. The dash-pot 53 of course controls the descent of the plunger 47, by providing an air cushion below the piston 52.

Projecting from the upper end of the plunger is an extension 56, which passes through the top of the solenoid casing and has secured to its upper end a yoke 57, to which is pivotally connected a slotted link
58. The solenoid casing 49 is mounted upon a suitable standard 59, and this standard is secured to the base 1 to one side of the standards 19 and the rotating carrier in which the slides or negatives are placed. The other extremity of the lever 40 is connected by means of a link 60 to a sliding support 61 which moves in grooves 62 formed in a pair of guides or standards 63, one of which is located below each wheel 23, adjacent and in line with the opening 34 in the hood 31. These guides or standards likewise have longitudinal openings 64 adjacent the lower ends thereof, and through one of these openings the outer end of the lever 40 passes.
Referring to Fig. 3 it will be seen that one of the standards 63 is of slightly less height than the other, and to the top of the lower standard, which is the standard shown at the right on Fig. 3, I secure an inclined plate 63', which extends upward and is connected at its opposite edge to the edge of the opening 34 through the cover 31, which incloses the carrier.

Figure 4:
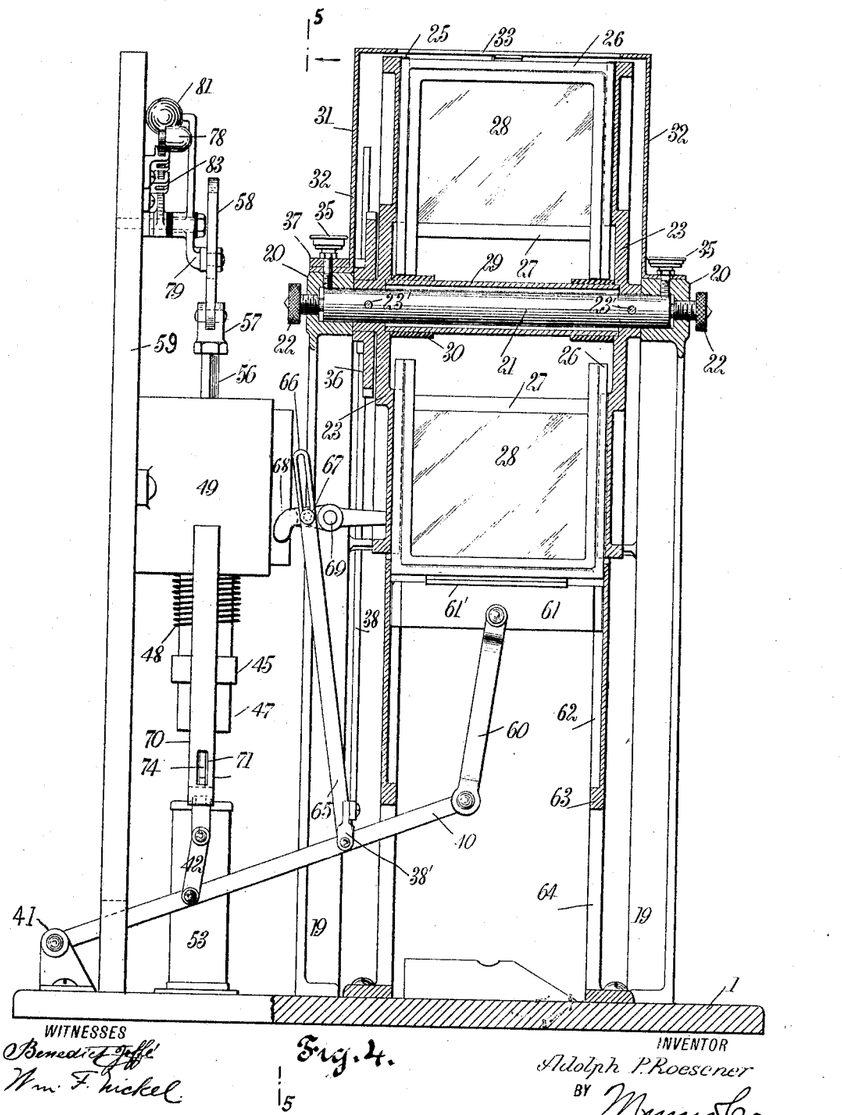
Fig. 4 is a sectional view on the line 4—4 of Fig. 1, looking in the direction of the arrow.

Secured to the lever 40 adjacent the point of connection of the short link 38 is another link 65, which has an upper slotted end 66. The slotted end 66 of this lever engages a pin 67 upon a weighted arm 68, this weighted arm being pivoted at 69 to one of the standards 19. The outer end of this arm 68, referring to Fig. 4, is heavier than the inner end, and normally tends to overbalance the inner end, but when the arm 68 has its outer end held up by the link 65, the inner end will project between the spokes of the adjacent wheel 23 and hold the same against rotation.

Secured to one side of the casing 49 and extending downward is a bar 70 having a longitudinal slot 71 adjacent its lower extremity, and having formed at the lower end of this slot a projection or lug 72.

73 represents a pair of projections extending outward from the block 44; and pivotally secured between these projections is a trip 74 mounted upon a pivot 75.

76 is a pin carried by the lug 73 above the pin 75, to limit the outward movement of the upper end of the trip, which is designed to engage with a shoulder 77 formed upon the bar 43 slidably mounted in the block 44, the block 44 having an opening in one face between the projection 73 to expose a portion of the bar 43 for this purpose.
Pivotally mounted adjacent the upper end of the slotted link 58 and secured to the plunger 47 is a bell-crank lever 78, the arms of which terminate in knobs, as shown on Fig. 5. 79 is a similar bell-crank lever having a short arm with a wrist-pin 80 received by the slotted link 58, and a long arm terminating in a weight 81.

82 and 83 are pairs of contacts which are bridged by the arms of the bell-crank lever 78 in succession to close the circuit to the solenoid when the carrier having the slides is to be turned or current is needed for the lamp 3.

Figure 3:
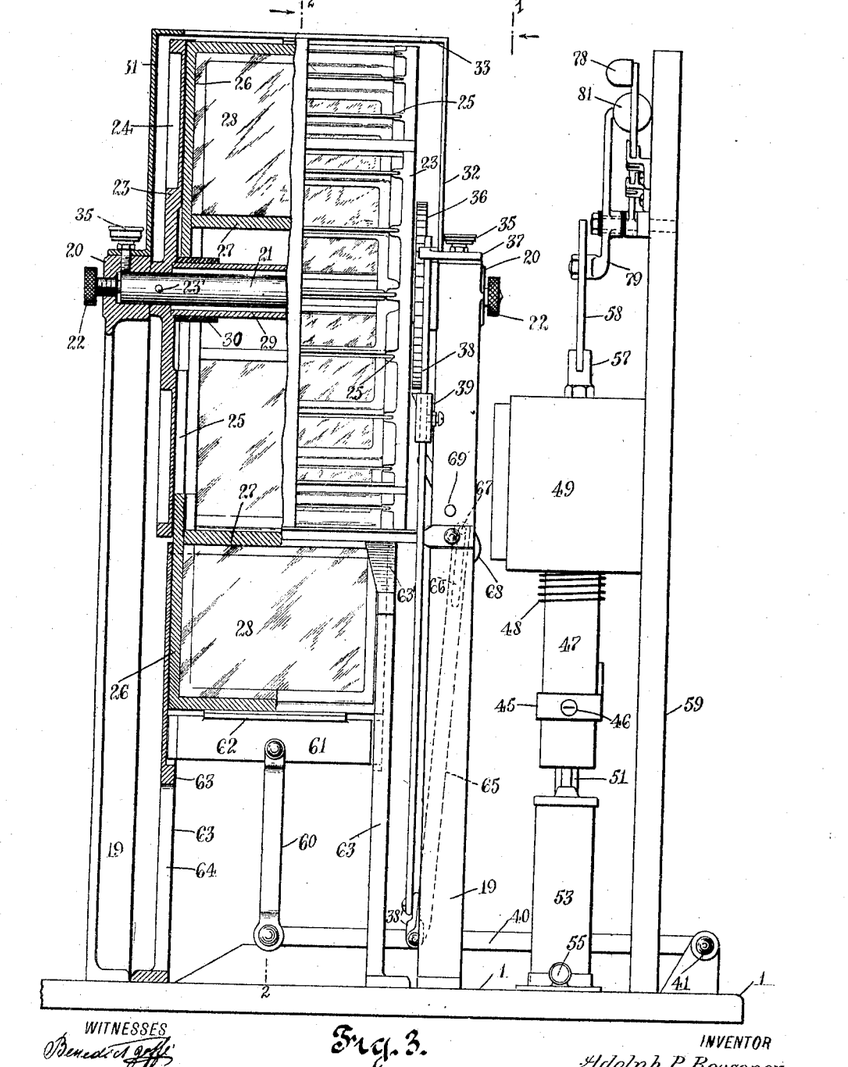
Fig. 3 is a transverse vertical sectional view taken on the line 3—3 of Fig. 4, looking in the direction of the arrow.

I insulate the levers 77 and 78 from each other, as shown in Fig. 3, and these levers must also be insulated from the contacts 82 and 83, as will be readily understood. The knobs on the ends of the arms of the levers 78 are preferably of insulation also.

The diagram of circuits is shown in Fig. 6. 84 represents a source of current from which leads a conductor to a pair of terminals 85 and 86. From the terminal 85 leads a wire which passes through the lamp 3, the other terminal of the lamp being connected to one of the contacts 82, the other contact 82 being connected to the other lead from the source 84. From the contact 86 leads a wire to the solenoid 50, and from the other terminal of the solenoid leads a wire to one of the contacts 83, the other contact being connected with the return wire of the source 84, as shown. When the terminals 83 are bridged by one of the arms of the lever 78, the solenoid 50 is energized, the lamp not being used; and when the terminals 82 are bridged the lamp is supplied with power and the solenoid 50 cut out.

In practice, the frames 26 are inserted through the opening 33 in the hood 31, these frames 26 carrying the slides or negatives until all of the spokes on the two wheels 23 comprised in the carrier are filled. The opening 34 may be closed up at this time by any convenient object, to prevent the slides from dropping through the opening 34, until all the slides are in place.

Owing to the fact that the weight 81 on the long arm of the bell-crank lever 79 will always tend to move to the lowest position, one arm of the bell-crank lever 78 will always be in position to close one of the pair of contacts 82 and 83. Let us suppose that at starting the contacts 83 will be bridged, but that there will be no current in the circuit, owing to the fact that the switch 88 which connects the generator 84 to the contacts 85 and 86 is open. As a result, the solenoid will be at the lower limit of its movement. The trip 74 will project at its lower end through the slot 71 in the bar 70, and at its upper end will engage with the shoulder 77 in the bar 43. In this position of the parts the lever 40 will likewise be depressed and so will the support 61. Should any one of the frames 26 be opposite the opening 34 at this time, the weight thereof will have caused it to slide down until it rests upon the top of the support 61, and if desired, a suitable cushion

61' can be carried on the top of the support 61 for this purpose. Now, if the circuit be closed by throwing the switch 88 to bridge the circuit to the contact 86, a solenoid will be energized, and the armature core pulled up. This armature will lift the block 44 with it. The block through the trip 74 will pull up the bar 43. This will raise the lever 40 and elevate the support 61 until the frame 26 carrying one of the slides or negatives which rests thereon, is raised to such an extent that it lower edge is on a level with the lower end of the plate 63'. The standard 63 to which the plate 63' is connected at its lower end may have a shoulder formed to receive the lower edge of the frame 26, if desired.

The upward movement of the lever 40 of course carries up with it the links 38 and 65. The link 38 and the link 65 and the slot in the end thereof are so designed that the pawl 39 carried by the link 38 will actuate the ratchet 36 before the slot in the upper end of the link 65 will engage the pin 67 on the stop lever 68 to move it to horizontal position, as shown in Fig. 4.

Figure 1:
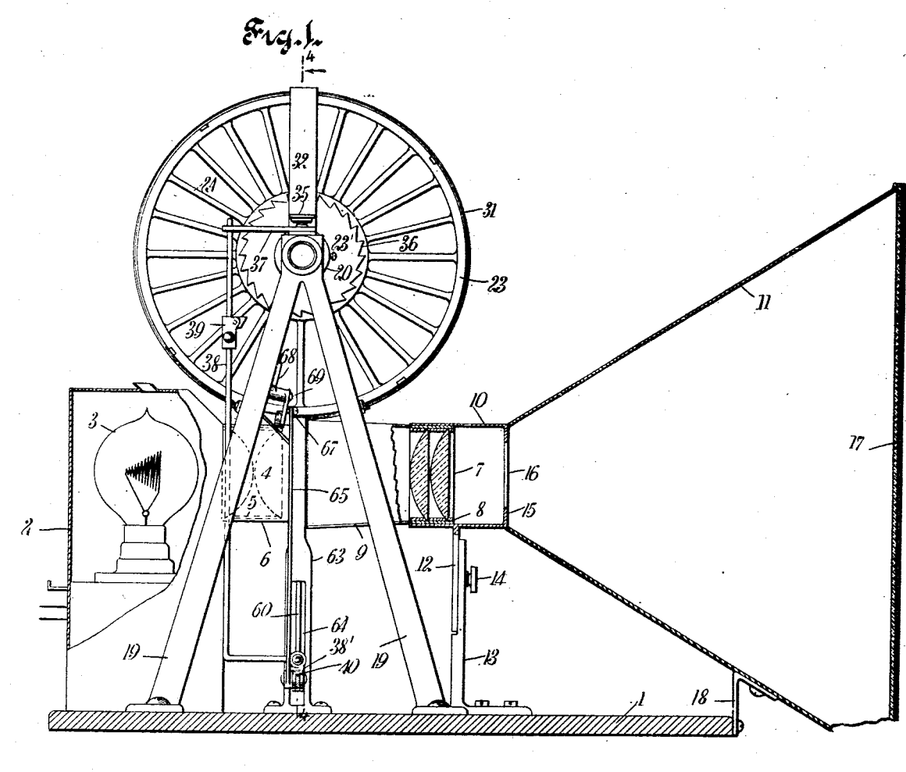
Figure 1 is a side elevation, partly in section, showing my exhibiting apparatus as a whole, the plane of section and direction of view being indicated by the line 1—1 and the arrow adjacent thereto on Fig. 3.
Figure 2:
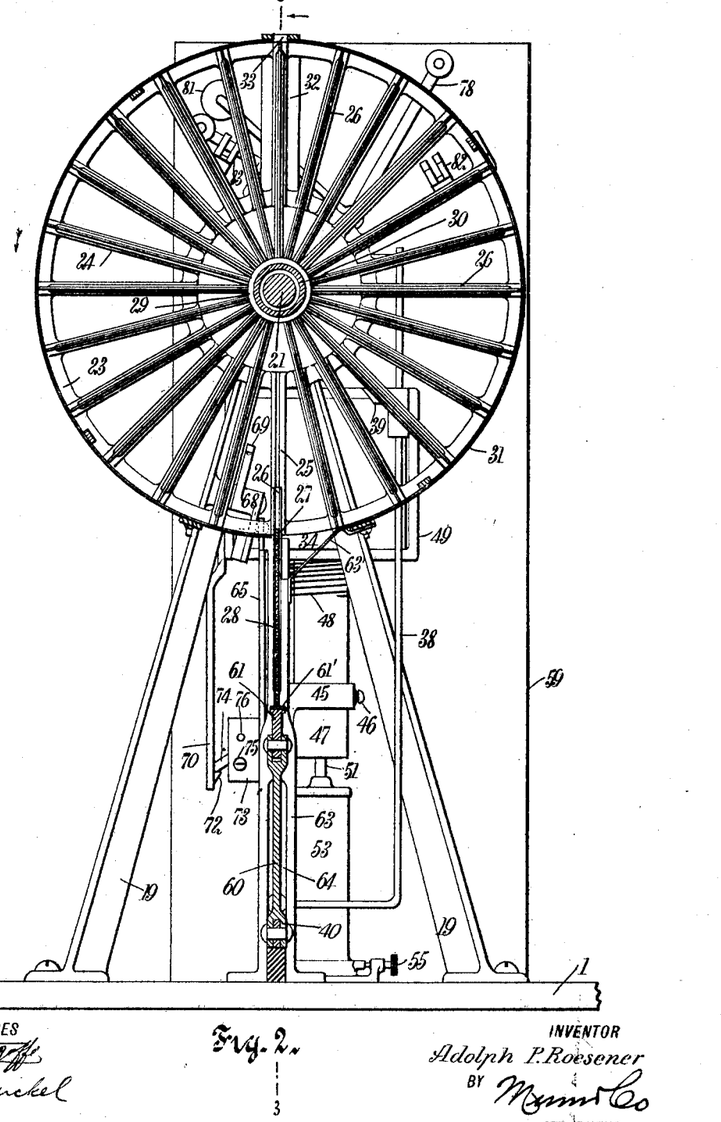
Fig. 2 is a vertical longitudinal sectional view taken on the line 2—2 of Fig. 3, looking in the direction of the arrow.

When the pawl 39 engages the ratchet 36 it rotates the carrier, but this movement of rotation does not begin until the support 61 has raised the frame 26 resting thereon to the height of the lower end of the inclined plate 63'. Then, as the carrier rotates, this inclined plate 63' has a cam action on the frame 26 to return the same entirely into the carrier, so that the whole length of the lateral edges of the frame 26 will lie within the grooves formed in the spokes 24. In this position the frame 26 can be carried around with the other frames inside of the body of the carrier inside of the hood 31. The direction of rotation of the carrier is shown by the arrow in Fig. 2.

While the plate 26 which rested upon the support 61 is being returned into the carrier, the next plate behind this one is being moved into position directly above the support. As soon as the outer edge of the frame 26 clears the adjacent edge of the opening 34 the bottom of the slot 66 in the link 65 moves the stop lever 68 to engage the nearest spoke 24 on the carrier and stop the same. The frame now adjacent the opening 34 slides down until its lower edge rests upon the support 61. When these operations have taken place the solenoid has drawn up the core 47 to such a height that the lower end of the trip 74 is engaged by the upper end of the slot 71 in the bar 70. Hence, the trip 74 will be moved so as to withdraw its upper end from the shoulder 77 in the bar 43, and this bar will be dropped. As a result, the lever 40 and the links 38, 60 and 65 will sink. The weight of the frame 26 resting upon the support 61 will cause the frame 26 to sink with the support 61 until it comes into position adjacent the lenses 4, so that light passing through the lenses 4 and 7 can throw the designs carried by the plate 28 in the frame 26 in question into position to be observed.

After the trip 74 releases the bar 43, the solenoid 47 continues its upward movement until the lower end of the slot in the link 58 moves the weight 81 in a clockwise direction past central position. This weight will then fall upon the knob on the right-hand arm of the lever 78 and cause this arm to bridge the contacts 82. This allows current to flow through the lamp 3, and cause the lamp to light up, sending its beams through the slide or negative in the frame 26, as is required at this time. This action breaks the circuit to the solenoid by disconnecting the contacts 83, and the spring 47 now acts upon the block 44 to return the solenoid to its starting point.

The downward movement of the solenoid is cushioned and retarded by the dash-pot 53, thus allowing sufficient time for the design or image upon the slide or negative to be exhibited. When the solenoid 47 has reached the end of its downward movement, the block 44, which is secured to the same, will have carried the trip 74 to such a position that its lower end can project through the slot 71 in the bar 70. The upper end of the trip 74 will thus be allowed to come into engagement again with the shoulder 77 on the bar 43. A spring may be used to insure this engagement. Before this happens, however, the upper end of the slot through the link 58 will have pulled down upon the wrist-pin 80 in the short arm of the bell-crank lever 79. This will move the weight 81 in a counter-clockwise direction, and as soon as it passes center it will strike the left arm of the bell-crank lever 78 and return it to position to bridge the contacts 83. As a result, the solenoid will now be energized and again elevated. The result will be that the frame 26 in operative relation to the projecting device will be returned into the carrier and another frame moved in position to pass down through the opening 34 in its turn.

The spring 48 not only assists in returning the solenoid to its original position, but it opposes its upward movement after the trip 74 has been actuated to release the bar 43. This spring and the strength of the solenoid 50 will be so designed that sufficient time will elapse after the trip 74 has been actuated to release the bar 43, before the switch lever 78 will be moved into position to close the lamp circuit, to allow the frame 26, which at this time is resting upon the support 61, to be brought down to the limit of its movement, so as to be in proper position in the front of the lenses 4; and the strength of the spring and the dash-pot 53 will be so designed that sufficient time to give a good exposure will be afforded before the solenoid core 47 is forced down to such an extent as to break the lighting circuit and again close the solenoid circuit so as to cause the core 47 through the trip 74 to raise the lever 40 and the links 38, 60 and 65, to repeat the above-described operation of returning the frame on the support 61 into the carrier 6, as will be apparent to those skilled in the art.

From this description it will be seen that when once the apparatus is set in motion it will be automatically actuated and controlled, and the slides or negatives will be exhibited, each in turn, until the carrier has made a complete revolution, so long as the circuit is not broken, by opening the switch 88. The carrier will then continue revolving and the series of slides or negatives again exhibited, the same as in the course of the first rotation of the carrier. In fact, the operation will continue as long as the power is turned on, the slides or negatives being dropped into the projecting device and the light turned on and off at the proper moment when the slide is to be returned for any desired length of time.

By means of the controlling and actuating mechanism above described it will be seen that the solenoid is energized during the upstroke of the plunger or armature 47, and the light at this time is extinguished. When the solenoid has drawn the plunger 47 to the end of its up stroke, the power is cut off from the solenoid and applied to the lamp. It thus appears that power is sent to the lamp 3 and solenoid 50 by turns, and neither consumes current when power is being sent to the other. This effects a great saving in energy and considerably cheapens the cost of operation, as will be readily understood.

I wish to have it understood that the mechanism shown and described herein is illustrative only, disclosing but one embodiment of my invention, and that I do not wish to be limited to the details thereof, except in so far as is indicated by the appended claims.

Having thus described my invention, I claim as new and desire to secure by Letters Patent:

1. Exhibiting apparatus of the kind described, comprising a rotating carrier, means formed inside of the same for receiving a plurality of slides or negatives, a cover for said carrier, said cover having an opening through the bottom to permit each slide or negative to pass through said opening upon being moved over the front edge of the same, and an inclined plate connected to the opposite edge, whereby, when the slide or negative is raised to a level with the lower edge of said inclined plate, the movement of the carrier will cause the inclined plate to have a cam action on the lower edge of the slide or negative and return the same into the carrier.

2. Exhibiting apparatus comprising a movable carrier having means for receiving a plurality of slides or negatives, a cover for said carrier, said cover having an opening in its bottom to permit each slide or negative to pass therethrough in succession, means for lowering each of said slides or negatives as the same passes through said opening, and subsequently returning the same into said carrier, and means operated by the lowering means for arresting the carrier as each slide or negative comes into position to pass through said opening.

3. Exhibiting apparatus of the kind described, comprising an actuating device, said actuating device including a solenoid having a movable core, a bell-crank lever and a pair of contacts located adjacent each arm of said lever mounted adjacent the solenoid, another bell-crank lever having a weighted knob at one end, and means for connecting said other bell-crank lever to the core of the solenoid, whereby when said other bell-crank lever is operated it will move the first bell-crank lever to make the arms thereof bridge one or the other of said pairs of contacts.

4. In an exhibiting apparatus of the kind described, the combination of a solenoid having a movable core, a block connected to said movable core, a rod slidably mounted in said block, actuating mechanism connected to said rod, a trip carried by said block engaging a shoulder on said rod, and means for moving said trip out of engaging position, whereby the rod will be moved by the solenoid during a portion of its movement in one direction, and then released by said trip.

5. Exhibiting apparatus of the kind described, comprising a rotating carrier, a plurality of slides or negatives therein, means for operating said carrier, means for causing each slide or negative to pass out of the same and be returned thereto, a reciprocating member connected to the last-named means to actuate the same, a trip for disconnecting said last-named means and said reciprocating member after said reciprocating member has finished a portion of its movement, and means for controlling a projecting device by said reciprocating member after the same is disengaged from the last-named means.

6. Exhibiting apparatus of the kind described, comprising a carrier containing a plurality of slides or negatives, a projecting device containing illuminating means, means for causing each of said slides or negatives to move from said carrier into operative relation with the projecting device in succession, means for actuating the carrier and controlling the exit of each slide therefrom, said means also serving to return the slides into the carrier, a circuit for said illuminating means, and means for closing said circuit and permitting power to be supplied to the illuminating means when each of the slides or negatives has moved out of the carrier and before the same is returned thereinto.

7. Exhibiting apparatus of the kind described, comprising a carrier having a plurality of slides or negatives, a projecting device, means for causing each of said slides or negatives to move from the carrier into operative relation to the projecting device by turns, means for controlling said movement, said means also causing the slide or negative to be subsequently returned into the carrier, electrically-actuated means for controlling said last-named means, illuminating means associated with said projecting device, a circuit therefor, and means for closing said circuit to supply power to the illuminating device after each slide moves into operative relation to the projecting device and before the said slide is returned into the carrier.

8. Exhibiting apparatus comprising a carrier having means to enable the carrier to hold a plurality of slides or negatives, means for permitting said slides or negatives to move out of said carrier in succession, means for subsequently moving said slides or negatives in position to be returned into the carrier, and means depending upon the movement of the carrier to complete the returning operation.

9. Exhibiting apparatus comprising a carrier, means formed inside the same for enabling the carrier to contain a plurality of slides or negatives, means for permitting said slides or negatives to move out of said carrier in succession, means for moving said slides or negatives in position to be returned into said carrier, and inclined means engaging the outer end of each slide or negative to complete the return of the same upon the movement of the carrier.

10. Exhibiting apparatus comprising a movable carrier for holding a plurality of slides or negatives mounted to move into and out of said carrier, movable means controlling the inward and outward movements of said slides or negatives, and means operated by said controlling means for arresting the carrier during the engagement of a slide or negative with said movable means.

11. Exhibiting apparatus comprising a movable carrier for holding a plurality of slides or negatives, said slides or negatives being mounted for inward and outward movement with respect to said carrier, means for controlling the movements of said slides, means operated by the said controlling means for moving the carrier when each slide or negative is returned into the same, and means also operated by the controlling means for arresting the carrier when a slide or negative is in engagement with said controlling means.

12. Exhibiting apparatus comprising a movable carrier, movably-mounted means having a weighted end for arresting the motion of said carrier, said weighted end holding the said means out of operative position, and means for operating said movably-mounted means to move the same into position to engage the carrier.

13. Exhibiting apparatus comprising projecting apparatus a solenoid, an operating core for the same, means operated by the movement of said core for controlling the movement of one or more slides or negatives into operative relation with respect to said projecting apparatus, said apparatus comprising an illuminating member, a power circuit for said solenoid and a power circuit for said lamp, and means operated by the core for closing the circuit through the solenoid and through the lamp in alternation.

14. An exhibiting apparatus comprising projecting apparatus a solenoid, a plunger to be moved thereby, means actuated by the plunger for controlling the movements of one or more slides or negatives into and out of operative relation with respect to the projecting apparatus, an electric lamp for said projecting apparatus, a source of power and a circuit having branches to supply said solenoid and said lamp, and switching means controlled by the plunger for closing the circuit through the solenoid and the lamp in alternation to energize the lamp when each slide is in operative relation and deënergize the same when each slide is to be moved out of such operative relation.

15. Exhibiting apparatus comprising an actuating member, means for controlling the movements of one or more slides or negatives into operative relation with respect to a projecting device, and a trip for connecting the actuating member to the controlling means to release the controlling means from the actuating member when the latter has finished its working stroke.

16. Exhibiting apparatus comprising an actuating member, means for controlling the movement of one or more slides or negatives into operative relation with respect to a projecting device, a member having a shoulder connected to the controlling means, and a trip carried by the actuating member to engage the shoulder, said trip causing the controlling means to be moved by the actuating member and releasing the controlling means therefrom when the actuating member has finished its working stroke.

17. Exhibiting apparatus comprising an actuating member, means for controlling the movement of one or more slides or negatives into operative relation with respect to projecting apparatus, a block having a bearing therein connected to the actuating member, said bearing receiving a rod having a shoulder thereon, and a trip carried by said block to engage said shoulder, whereby the actuating member will move the controlling means to be released by the trip when the actuating member has finished its working stroke.

18. Exhibiting apparatus comprising a projecting device, a casing having an opening, a slide movably mounted in said casing, means for enabling said slide to move out of said casing through said opening movable means receiving said slide and placing it into operative relation to said projecting device and afterward returning it into the said casing, said device including an illuminating member, and means for causing said illuminating member to emit light rays only when the slide is in such operative relation with the projecting device.

19. Exhibiting apparatus comprising a projecting device containing an electric lamp, a casing having an opening, a slide movably mounted in said casing, means for enabling said slide to move out of said casing through said opening movable means receiving said slide and placing it into operative relation with said projecting device, and then returning it into the casing, and means for energizing said lamp when the slide has been moved into operative relation, and de-energizing the lamp after the slide has been moved out of said operative relation.

In testimony whereof I have signed my name to this specification in the presence of two subscribing witnesses.

ADOLPH P. ROESENER.

Witnesses:
WILLIAM F. NICKEL,
PHILIP D. ROLLHAUS.